United States Patent [19]

Proctor et al.

[11] Patent Number: 4,909,042
[45] Date of Patent: Mar. 20, 1990

[54] AIR CONDITIONER CHARGING STATION WITH SAME REFRIGERANT RECLAIMING AND LIQUID REFRIGERANT RETURN AND METHOD

[75] Inventors: Robert H. Proctor, Rossville; Dennis P. Eichenlaub, Kingstown, both of Md.

[73] Assignee: Murray Corporation, Cockeysville, Md.

[21] Appl. No.: 176,551

[22] Filed: Apr. 1, 1988

Related U.S. Application Data

[63] Continuation-in-part of Ser. No. 131,623, Dec. 10, 1987.

[51] Int. Cl.⁴ .............................................. F25B 45/00
[52] U.S. Cl. ........................................ 62/149; 62/292; 62/503; 62/509
[58] Field of Search .................... 62/149, 77, 292, 174, 62/85, 228.3, 503, 509

[56] References Cited

U.S. PATENT DOCUMENTS

| | | | |
|---|---|---|---|
| 2,499,170 | 2/1950 | Shoemaker | 62/149 |
| 3,232,070 | 1/1966 | Sparano | 62/292 |
| 3,699,781 | 10/1972 | Taylor | 62/85 X |
| 4,106,306 | 8/1978 | Saunders | 62/149 |
| 4,261,178 | 4/1981 | Cain | 62/149 |
| 4,285,206 | 8/1981 | Koser | 62/126 |
| 4,363,222 | 12/1982 | Cain | 62/292 |
| 4,364,236 | 12/1982 | Lower et al. | 62/77 |
| 4,441,330 | 4/1984 | Lower et al. | 62/149 |
| 4,476,688 | 10/1984 | Goddard | 62/149 |
| 4,488,409 | 12/1984 | Hara | 62/127 |
| 4,513,578 | 4/1985 | Proctor et al. | 62/149 |
| 4,539,817 | 9/1985 | Staggs et al. | 62/149 |
| 4,554,792 | 11/1985 | Margulefsky et al. | 62/77 |
| 4,624,112 | 11/1986 | Proctor | 62/149 |
| 4,646,527 | 3/1987 | Taylor | 62/85 |
| 4,688,389 | 8/1987 | Iida | 62/127 |

*Primary Examiner*—Harry B. Tanner
*Attorney, Agent, or Firm*—King & Schickli

[57] ABSTRACT

An air conditioner charging station withdraws refrigerant from an air conditioner, reclaims it by removing certain materials, and returns the reclaimed refrigerant to the same air conditioner from which it was withdrawn, and also provides preselected commands upon receipt of signals indicating conditions of temperature, pressure, etc. The reclaimed refrigerant is deposited into a reservoir, which contains a float that cooperates with a level sensor and signal generator to send a signal when the liquid level has reached a predetermined position. This signal causes a valve in the discharge line from the reservoir to close, to prevent discharge of gas from the reservoir. The charging station includes a high pressure conduit and a low pressure conduit which are attached to the air conditioner to be serviced, there being a crossover conduit between them with a solenoid valve in it; the solenoid valve is controlled by a pressure switch sensing pressure on the high pressure side, and the microprocessor, the parts being connected through a relay such that when an excess of pressure occurs, the relay is shifted so as to by-pass the microprocessor to maintain the solenoid valve energized, with the valve thereby being closed.

5 Claims, 1 Drawing Sheet

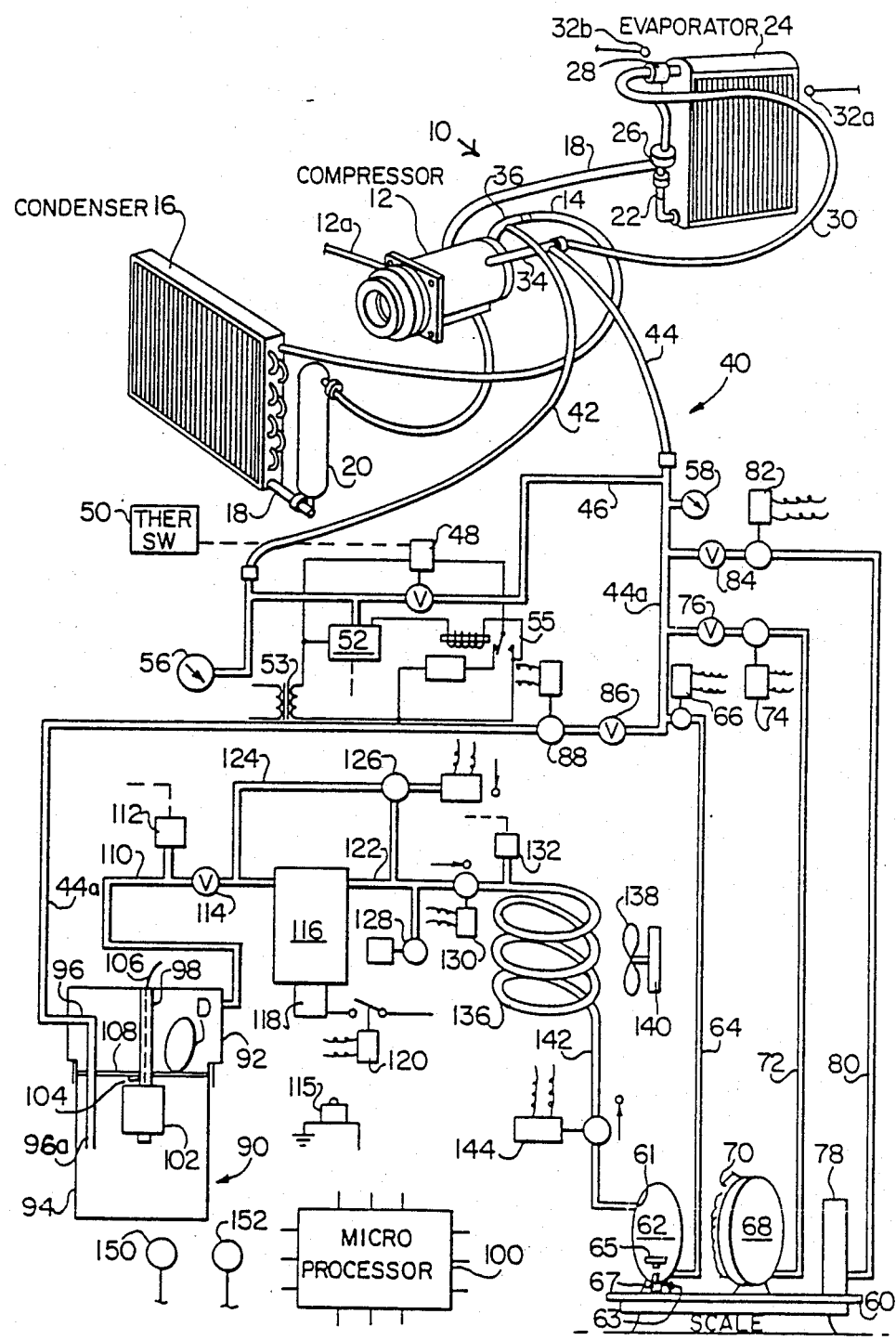

AIR CONDITIONER CHARGING STATION WITH SAME REFRIGERANT RECLAIMING AND LIQUID REFRIGERANT RETURN AND METHOD

This application is a continuation-in-part application of U.S. application Ser. No. 131,623 filed Dec. 10, 1987, and entitled "AIR CONDITIONER CHARGING STATION WITH SAME REFRIGERANT RETURN AND METHOD".

BACKGROUND OF THE INVENTION

The present invention relates to an automatic air conditioner charging station for charging refrigerant and oil into air conditioner systems, such as automobile air conditioner systems.

A number of apparatus have been provided for automatically charging such air conditioners. Among those are Proctor et al. U.S. Pat. No. 4,513,578 and Proctor U.S. Pat. No. 4,624,112. The former patent discloses an air conditioner charging station having a weighing scale on which are mounted reservoirs for oil and refrigerant, and an electronic sequencing unit, or microprocessor, which senses the weight loss of the reservoirs as first oil is charged into the air conditioner and then refrigerant is charged into the air conditioner, the amount of each which is charged into the air conditioner being determined by an operator entering into the computer the required amounts of oil and refrigerant for a particular air conditioner. Proctor U.S. Pat. No. 4,624,112 discloses a system of that general type, in which there is provided a conduit connecting the high and low pressure side conduits, called a cross-over conduit, and having a solenoid operated valve in it, together with a solenoid operated dump valve for dumping refrigerant and oil.

Sparano U.S. Pat. No. 3,232,070 conducts withdrawn refrigerant through a compressor and condenser, and then to a drier strainer, from which it is placed into a storage tank.

Taylor U.S. Pat. No. 3,699,781 provides a refrigerant recovery system in which the refrigerant gas is cooled in order to remove liquid by causing condensation in a coil, prior to introduction of the refrigerant into a drier.

Koser U.S. Pat. No. 4,285,206 discloses a system which is capable of simultaneously connecting a refrigerant recovery and purification apparatus to the air conditioner systems of two vehicles and includes a reclaim refrigerant tank mounted on a scale, and a tank for new refrigerant, one air conditioner system being recharged with reconditioned refrigerant while the other air conditioner system is having the refrigerant therein withdrawn for reclaiming.

Lower et al. U.S. Pat. No. 4,364,236 and Lower et al. U.S. Pat. No. 4,441,330 provide a system in which refrigerant is withdrawn from an air conditioner and passes through a particulate filter, an evaporator, an oil separator, a compressor, a condenser, and to a reservoir, and thence to a purifier, purified refrigerant from the reservoir being charged into an air conditioner being serviced; a microprocessor is used to effect the sequencing of the operations.

Goddard U.S. Pat. No. 4,476,688 discloses a refrigerant recovery and purification system in which refrigerant is withdrawn from an air conditioner and passed through an oil separator and a filter-drier by a compressor and into a receiving tank for the reclaimed refrigerant. The refrigerant is delivered from the reclaim tank, for charging into the air conditioner. A purge valve and a high pressure switch for a condenser are provided to bleed off air when air pressure in the condenser evaporator becomes excessive. Such excess pressure causes the compressor to be shut down.

Margulefsky et al. U.S. Pat. No. 4,480,446 provides a system for rehabilitating refrigerant including a filtering tank with a disc-shaped filter.

Taylor U.S. Pat. No. 4,646,527 provides a refrigerant recovery and purification system which includes a compressor and an oil separator, and accumulators having heat exchange coils in them, the recovered refrigerant being placed in a storage tank; in this system, distillation is utilized to separator oil and other impurities from the refrigerant.

Cain U.S. Pat. Nos. 4,261,178 and 4,363,222 disclose a refrigerant recovery system in which refrigerant is withdrawn and directed to a cylinder on a scale: there is also disclosed a separate system in which a pump produces a vacuum in a tank, which is then connected with an air conditioner in order to remove part of the refrigerant from it.

Staggs et al U.S. Pat. No. 4,539,817 provides a refrigerant recovery apparatus which includes a compressor and filters, and a storage tank.

Saunders U.S. Pat. No. 4,106,306 provides a charging apparatus for charging a refrigeration system of the type having a capillary tube, and discloses an electrical circuit for controlling the charging, which circuit receives data relating to indoor and outdoor temperature, to suction line temperature and to suction line pressure. There have been provided disclosures of a number of systems for diagnosing the operation or servicing of such air conditioners.

Motl U.S. Pat. No. 3,686,954 provides system for testing or diagnosing an air conditioner using solenoid valves actuated by manually operated switchers; the temperatures and pressures of the system are measured and readouts are provided by gauges.

Suzuki et al. U.S. Pat. No. 4,663,940 disclose a self-diagnostic apparatus for an automobile air conditioner which utilizes a microprocessor, input signals to which include sensing the position of dampers in air flow ducts. Also, of general interest are Hara U.S. Pat. No. 4,488,409 and Iida U.S. Pat. No. 4,688,389.

SUMMARY OF THE INVENTION

An air conditioner charging station or apparatus is provided in which refrigerant is withdrawn from an air conditioner, such as in an automobile, is reconditioned or reclaimed as by removing at least one of such extraneous or contaminant elements as oil, particles of metal, and there is returned to the air conditioner being serviced substantially only reclaimed refrigerant which is in the liquid state from that air conditioner. The apparatus includes conduits which are connected to the high pressure and low pressure sides of an air conditioner, there being in the apparatus, in series, a separator, a compressor, a condenser, and a reclaimed refrigerant cylinder or reservoir. There are also provided a reservoir containing new refrigerant, and a tank or reservoir of oil, all three tanks or reservoirs having means to measure the amount of material dispensed, such as a scale upon which they rest. To achieve the return of substantially only the same refrigerant, after it has been reclaimed, to the air conditioner from which it was withdrawn, the amount of reclaimed refrigerant delivered to or from the reclaimed refrigerant cylinder or reservoir has the quantity thereof measured, as by determining weight added, or lost by dispensing; refrigerant from the new make-up refrigerant cylinder is added to the charge to the air conditioner to the extent necessary, to make up a full charge. Pressure operated switches or transducers are provided at the high and low pressure sides of the compressor of the air conditioner, another at the outlet o the separator and another at the outlet of the compressor.

A solenoid valve is in the conduit connected to the high pressure side of the air conditioner, and is controlled by a circuit which includes the pressure operated switch at the high side of the compressor and by a control switch which forms a part of a microprocessor, so that where there is a suitably normal low pressure in the high pressure conduit, the solenoid valve is under the control of the microprocessor, but when a high pressure occurs in the high pressure side, the solenoid valve is removed from the control of the microprocessor and is caused to be closed.

A dump valve is provided for discharging to the atmosphere material such as non-condensable gases, which may have collected in the reclaim cylinder and/or in the condenser, the dump valve being connected to the inlet to the condenser. The reclaim cylinder or reservoir is located at a lower level than the condense,, so that such gases may rise from the reclaim cylinder to the top of the condenser, for eventual evacuation.

The reclaim cylinder reservoir is provided with a liquid refrigerant level sensor which sends a signal to close a valve controlling the outlet from the reclaim refrigerant reservoir to close it when the level of the liquid refrigerant in the reclaim reservoir has reached a predetermined low level.

The pressure switch at the inlet of the separator controls, through a microprocessor, the start-up of the compressor. A by-pass circuit is provided for by-passing high pressure refrigerant from the discharge side of the compressor to the inlet side of the compressor, for substantially equalizing the system compressor inlet and outlet pressures.

Among the objects of the present invention is the provision of an air conditioner charging station and method which removes and reconditions refrigerant, and returns to the air conditioner being serviced substantially only reclaimed refrigerant removed from that air conditioner. Another object is to provide an air conditioner charging station apparatus and method in which there is provided a recharging of an air conditioner with substantially only refrigerant in liquid state which has been removed from that air conditioner and reclaimed, and new refrigerant to the extent necessary to make up a full recharge.

Yet another object of the present invention is the provision of an air conditioner charging station or apparatus in which evacuation of non-condensable gases is readily achieved from both a receiver for reclaimed refrigerant and a condenser.

A still further object of the present invention is to avoid the discharge of refrigerant form the high pressure side of the air conditioner being serviced when an excess pressure exists in the high pressure side of the air conditioner, while enabling communication to and from the high pressure side of the air conditioner to be controlled by a microprocessor when the high pressure side of the air conditioner is at normal pressure.

Other objects and many of the attendant advantages of the present invention will be more readily understood from consideration of the following specification, claims and drawings.

BRIEF DESCRIPTION OF THE DRAWING

The single FIGURE of the drawing is a partly schematic and representational showing of a conventional air conditioner, and a charging station or system in accordance with the present invention.

DESCRIPTION OF THE PREFERRED EMBODIMENT

Referring now to the drawing, there is shown a conventional air conditioner generally designated 10, such as is typically used in automobiles. The air conditioner 10 includes a compressor 12 having a high pressure side from which fluid refrigerant is conducted by a high pressure conduit 14, which is connected to condenser 16. The discharge conduit 18 of condenser 16 may pass through a receiver-drier 20, and is connected to the inlet conduit 22 of evaporator 24 through expansion valve 26. Expansion valve 26 is controlled in known manner by a temperature sensing element 28 attached to the suction conduit 30 extending from evaporator 24 to the low pressure conduit 34 of compressor 12. The high pressure conduit 14 is connected to the high side of compressor 12 through high pressure conduit 36, and to the high pressure conduit 36 there is connected, through a detachable fitting (not shown) a conduit 42, forming a part of an air conditioner charging station; similarly, to the low pressure conduit 34 there is detachably connected a low pressure conduit 44 forming a part of the air conditioner charging station. The high pressure conduit 42 and the low pressure conduit 44 are of conventional construction having fittings at their ends which are attachable to corresponding fittings at the high pressure conduit 36 and the low pressure conduit 34, respectively, of the air conditioner 10. The high pressure conduits 42 and 44 also have, adjacent their ends, cut-off valves (not shown) which are provided to prevent the escape of freon refrigerant into the atmosphere upon detachment of the conduits 42 and 44 from the air conditioner 10.

A temperature transducer 32a for sensing the temperature of air entering the evaporator 24 is provided, as well as a temperature transducer 32b for sensing the temperature of air after it has passed through the evaporator 24. There is provided, also, a probe 12a for sensing the cycling of the clutch of the compressor 12.

A crossover conduit 46 is connected to the high pressure conduit 42 and the low pressure conduit 44, there being a solenoid operated crossover valve 48 therein controlled by a thermal transducer switch 50. A pressure operated switch or transducer 52 senses high side pressure, and is connected to a transformer 53, as is the solenoid valve 48. The pressure operated switch or transducer 52 is connected also to an electronic sequencing unit or microprocessor 100, a part of which is shown schematically near transducer or switch 52, and to the armature of a relay 55, the movable contact of which is connected to the solenoid operated crossover valve 48. Under normal conditions, when a suitable low pressure is sensed by the pressure operated switch or transducer 52, the solenoid operated crossover valve 48 will be connected to the microprocessor 100, and to the secondary transformer 53. When an excess pressure occurs in the high pressure conduit 42 and crossover conduit 46, the pressure operated switch or transducer 52 will be opened, thereby causing the relay 55 to shift so as to disconnect the solenoid operated crossover valve 48 from the micropocessor 100, the solenoid operated valve 48 thereby being energized and the valve portion of it being closed so as to close the crossover conduit 46 and prevent the fluid connected between the high pressure conduit 42 and low pressure conduit 44 through the crossover conduit 46. There is also provided a gauge 56 to show the high side pressure. A gauge 58 will sense and indicate the low side pressure. These gauges are electronically operated digital displays.

Thermal switch or transducer 50 senses ambient temperature and pressure switch or transducer 52 senses the pressure at the high side of the compressor 12, and is opened at a selected high pressure as above indicated; pressure in excess of the selected pressure, will cause the solenoid valve 48 to close, to stop the passage of refrigerant from the high side of the compressor until such time as the pressure falls below the selected amount. The solenoid valve 48 is also connected to the microprocessor 100 and receives command signals from it, as will be explained below. However, such command signals may be overridden by a signal from the thermal switch or transducer 50 if ambient temperature is below a predetermined level, such as 60° F.

The air conditioner charging station 40 further comprises a change of amount sensor, specifically a scale 60, which generates signals proportional to changes in weight of refrigerant and/or oil thereon an which is connected to the microprocessor 100. On the scale 60 are a reclaim reservoir 62 for reconditioned refrigerant, having an inlet 61 at the top end, an outlet 63 near the bottom connected to outlet conduit 64 which is connected through a solenoid valve 66 to an extension 44a of the low pressure conduit 44. A float 65 in the reclaim reservoir 62 will actuate a sensor and signal generator 67 in the bottom, which will cause solenoid valve 66 to close, to prevent gas from entering outlet or delivery conduit 64. A cylinder 68 for storing new make-up refrigerant is also on the scale 60 and may be provided with a heater 70. A conduit 72 connects the make-up refrigerant storing cylinder 68 to the low pressure conduit extension 44a through a solenoid valve 74 and a check valve 76 which prevents flow of fluid from conduit 44a into the cylinder 68.

Preferably, there is also on scale 60 oil storing cylinder 78, connected by conduit 80 to the low pressure conduit extension 44a through solenoid operated valve 82 and check valve 84. The low pressure conduit 44, 44a is connected through a check valve 86 and a solenoid valve 88 to a separator 90, for separating from gaseous refrigerant other components which may be in refrigerant withdrawn from the air conditioner 10, including oil, liquid refrigerant, and particles such as metal particles which may have come from bearings in the compressor 12. The separator 00, which is schematically shown, includes a cap 92 which may be a casting of a suitable strong metal, there being attached to it a bowl 94 which depends from it, and which is preferably transparent. Bowl 94 is held to the cap 92 by any suitable releasable holding means such as screw threads. The cap 92 is provided with a suitable hose connecting fitting for attachment to the conduit 44a, and has within it an inlet conduit 96 of angular shape, having an arm 96a which extends downwardly into bowl 94 and having its discharge outlet at a relatively low level. A post 98 depends downwardly rom the cap 92, and has thereon a float 102 which may be caused to rise on post 98 when oil and/or liquid refrigerant has risen to a sufficient height. The post 98 is hollow, and supports a sensor 104 which is engaged by float 102 when liquid in the bowl 94 has reached a certain height, engagement with sensor 104 causing a signal to be sent to microprocessor 100 through conductor 106. A plate 108 is mounted on the post 98, and serves to support dessicant, as may be provided in a small bag D, in the space within separator 90 which will always be above the level of liquid therein. As many bags D as necessary may be provided, and upon disassembly of the bowl 94 from the cap 92, the dessicant may be replaced.

A conduit 110 extends from the separator 90, and gaseous refrigerant leaving the separator 90 will pass through the desiccant and be dried. Because of the low temperature of the gaseous refrigerant above the liquid level in the separator 90, the dessicant will be at a relatively low temperature, and will operate therefore effectively.

Oil from the refrigerant removed from the air conditioner 10 will be caught in the bowl 94 of separator 90, rather than being discharged. There will also remain in the bowl 94 particles and liquid refrigerant. The oil may contain refrigerant which is dissolved in it. Since the separator 90 is subject to ambient temperature, that refrigerant may boil off, and be recovered. The utilization of a transparent bowl 94 will enable the operator to readily ascertain abnormal conditions relating to the oil in the refrigerant withdrawn from the air conditioner 10, such as whether there is no oil or too little oil, or an undue amount of oil. Thus, the operator would be able to ascertain that the air conditioner 10 has either an inadequate supply of oil or an over supply of oil, as the case may be. With this knowledge, he can check for the reason why the proper oil-to-refrigerant ratio in the air conditioner 10 is not within an acceptable range. The bowl 94 is preferably provided with a gauge, so that a determination can quickly be made whether the amount of oil removed from the refrigerant is within the normal range, and if so, can, upon recharging of the air conditioner 10, command the microprocessor 100 to restore the proper amount of oil to air conditioner 109 from the oil storage tank 78. Further, it will be seen that the discharge end of the conduit 96a is below the float 102, so that entering refrigerant will not impact on the float 102 and alter its normal operation. The float 102 will be lifted only by liquid within the bowl 94, and any foam which may be present in bowl 94 will not have a lifting effect on the float 102, so that thereby a true sensing of the liquid level in bowl 94 may be obtained by the sensor or switch 104.

The conduit 110 which extends from the separator 90 has a pressure switch 112 connected to it, for sensing the pressure within the separator 90. A check valve 114 is included in the conduit 110 to prevent backflow of liquid or pressure into the separator 90. The placement of the check valve 114 in the conduit 110 is preferred, although check valve 114 may be either eliminated, or replaced by a solenoid valve.

Gaseous refrigerant from the separator 90 is delivered by the conduit 110 to a compressor 116 which is driven by a motor 118, the power to which is supplied through a solenoid switch 120. The compressor 116 is of a known type, capable of drawing refrigerant from the air conditioner 10 through the separator 90, and compressing the received refrigerant, which is gaseous. A conduit 122 serves to conduct compressed refrigerant from the compressor 116, and has connected to it a by-pass conduit 124 which extends from the conduit 122 to the conduit 110, having a solenoid operated valve 126 therein. As shown by the symbol adjacent to solenoid valve 126, it will be opened by an overpressure from the conduit 110, but an overpressure from conduit 122 will not open it, so that only when solenoid valve 126 is opened through energization of the solenoid will it be opened and refrigerant be permitted to flow through the by-pass conduit 124.

A solenoid operated dump valve 128 is connected to the conduit 122, and there is provided in the conduit 122 a solenoid operated control valve 130. Also in conduit 122 is a pressure switch 132.

Conduit 122 delivers reclaimed, purified and compressed refrigerant to the condenser 136 which is diagrammatically illustrated as comprising a coil; a fan 138 driven by a motor 140 may be caused to blow air across the condenser 134. The condensed refrigerant is delivered through conduit 142 having a solenoid valve 144 therein to the reclaim reservoir 62, the conduit 142 extending downwardly because the reclaim reservoir 62 is located at a lower level than the condenser 134, the conduit 142 entering the upper part of the reclaim reservoir 62.

In operation, the conduits 42 and 44 are connected to the air conditioner 10, and it is assumed that the solenoid valve 48 is closed when the air conditioner charging station 40 is turned on and current lows through the solenoid of solenoid valve 48; it is opened by microprocessor 100 only when charging refrigerant from either the reclaim reservoir 62 or make-up cylinder 68, or when dumping the charge of air conditioner 10, unless it is closed when the sensing of abnormal temperature by the thermal switch or transducer 50 or upon the sensing of abnormal pressure by the pressure switch or transducer 52. The solenoid valve 88 will be closed, and if the pressure switch 112 which senses the pressure in conduit 110 connecting the separator 90 with the compressor 116 is in the range of 15 to 20 pounds per square inch, pressure switch 112 will cause motor 118 and compressor 116 to be activated. When the pressure falls to approximately 0 psig, solenoid switch 120 will be opened, and the compressor 116 will stop. However, the signal from switch 112 passes through a microprocessor 100 to the solenoid switch 120 (or its equivalent) and under certain circumstances, the signal from pressure switch 112 may be overridden or by-passed so that, for example, when it is necessary to have the compressor pull a vacuum on the air conditioner 10, this may be effected by the overriding or bypassing by the signal from pressure transducer 112.

The purpose of the by-pass conduit 124 is to equalize the high and low pressure sides of the compressor 116 since known air conditioner compressors cannot start if there is differential between the low pressure side and the high pressure side which is too great. A compressor without such limitation would not need the by-pass conduit 124. The pressure on the high pressure side of the compressor 116 is sensed by the pressure switch 132 and the pressure on the low pressure side of the compressor 116 is sensed by the pressure switch 112, the signals from these switches being delivered to the microprocessor 100 for processing, and the controlling of the valve 126, to open it, to thereby permit the equalization of the pressures on the high and low pressure sides of compressor 116; when the microprocessor 100 causes the solenoid valve 166 to be opened, to unload the compressor 116, the dump solenoid valve 128 and the solenoid valve 130 in the conduit 122 are both closed. The result is that only a small volume of refrigerant flows from the high pressure side of compressor 116 to the low pressure side, and there is not introduced into the conduit 122 refrigerant from the condenser 136. When the compressor 116 is not being unloaded, the by-pass solenoid valve 126 is closed and the solenoid valve 130 in the conduit 122 to condenser 136 will be opened. When compressor 116 is restarted, control solenoid valve 130 is opened shortly after bypass valve 126 closes.

In overall operation, the compressor 116 withdraws refrigerant from the air conditioner compressor 12, the refrigerant flowing through the separator where oil, particles such as metal particles, and liquid refrigerant are removed, with reconditioned gaseous refrigerant then flowing to compressor 116 where it is compressed and delivered to the condenser 136, where it is condensed, and caused to flow into the reclaim reservoir 62 for the withdrawn and reconditioned refrigerant. That withdrawn, reconditioned refrigerant will pass to the compressor 12 of the air conditioner 10 upon the opening of solenoid valve 66 and the closing of the solenoid valve 144 in the conduit 142 leading to the intake of the reclaim reservoir 62. Thus, there will be returned to the compressor 12 from the reclaim reservoir 62 substantially only refrigerant which was withdrawn from compressor 12. In this way, any contamination which may be present in the refrigerant from one air conditioner system 10 in one automobile will not be mixed with refrigerant from another automobile, so that there is thereby avoided the transfer of contaminants from one air conditioner system to another. Thus, substantially only the same reconditioned refrigerant is returned to the air conditioner from which it is withdrawn, and, with the following exception, no refrigerant from another air conditioner is placed into the air conditioner being serviced. That exception is that a very small amount of refrigerant from a servicing operation on one vehicle air conditioner may remain in the condenser 136, and that a very small amount will be delivered to the reclaim reservoir 62 upon the initiation of servicing of a second air conditioner of a second automobile. However, that amount of refrigerant is so small that any contamination will be negligible, due to the extremely small amount of contaminant that may be delivered into the air conditioner of the second vehicle.

When reclaimed refrigerant is being delivered from the reclaim reservoir 62, should the liquid level fall to a predetermined level, the float 65 will activate the sensor 67, which will then send a signal to the solenoid valve 66 to prevent further discharge of refrigerant from the reclaim reservoir 62. This occurs when the level of reclaimed liquid refrigerant in the reclaim reservoir 62 is above the outlet 63, so that there is thereby prevented the entry of gaseous reclaimed refrigerant into the outlet conduit 64 and into the air conditioner 10.

If during operation the float 102 rises and strikes the sensor 104, a signal by way of conductor 106 to the microprocessor 100 causes the circuit to motor 118 to be broken, and compressor 116 will stop. There is provided a transparent switch button 115 with a light behind it which flashes at this time, there being provided adjacent to it a legend that the lighted button is to be depressed. Depression of this lighted button-switch will cause the microprocessor to close the solenoid valve 88 and to cause the compressor 116 to operate, to reduce the pressure within the separator 90, the solenoid valve 88 preventing the addition of more freon to separator 90; when the pressure in separator 90 is satisfactorily reduced to approximately 0 psig, this will be sensed by the switch 112, which will provide a signal to microprocessor 100, which will then shut down compressor 116. After that, the bowl 94 may be removed from the cap 92, the bowl emptied and cleaned, and the dessicant bag D replaced.

In some instances a part of the normal refrigerant charge of a particular air conditioner may have leaked out, so that the amount of withdrawn, reconditioned refrigerant delivered to the reclaim reservoir 62 is not sufficient to provide a complete charge for the air conditioner being serviced. To provide a complete charge, the amount of the deficiency is determined, as explained hereinbelow, and the necessary amount of refrigerant to provide a full charge is withdrawn from the make-up refrigerant cylinder 68. Thus, the air conditioner 10 will receive a full charge made up of one or a first component, which is the same refrigerant that was withdrawn from the air conditioner 10, and which was reconditioned by the separator 90, and to the extent necessary, a second component of new refrigerant from the make-up cylinder 68. As is known, a small amount of oil is usually introduced into the air conditioner during recharging, and this is provided from the oil storage tank 78, through conduit 80 when the solenoid valve 82 is opened.

Returning to the single FIGURE, the dump solenoid valve 128 is provided to permit dumping of material to atmosphere. That material may be non-condensible gas, which in most cases is air, which may have been contained in the withdrawn refrigerant. That air would be located in the upper or higher part of the condenser 136, at and near the inlet thereof. This non-condensible gas, or air, would have risen from the liquid refrigerant in the coils of the condenser 136 to the highest part of the condenser coil, liquid being of higher density being in the lower part of the coil of condenser 136. With the compressor 116 stopped, the solenoid by-pass valve 126 will be closed, the condenser valve 130 will be opened, and the dump valve 128 will be opened. Since the condenser 136 is at a higher elevation than the reclaim reservoir 62, any gas which will have accumulated in the reclaim reservoir 62 will, with solenoid valve 144 opened, pass upwardly to and through the condenser coil 136, since the reclaim reservoir 62 is below the condenser 136; that non-condensible gas, or air, will thus also be exhausted from the apparatus through the dump solenoid valve 128. This will avoid the incorporation of non-condensible gas, such as air, in the refrigerant which is returned to the air conditioner 10 which is being serviced.

Purging occurs when an excessive pressure, which may be approximately 325 psig, is sensed by the pressure switch 132. When this level of pressure is sensed, the compressor 116 is stopped, by interrupting the flow of current to the motor 118, and after a time delay, the microprocessor 100 causes the condenser solenoid valve 130 and the dump solenoid valve 128 to open to permit the above described dumping function. The pressure build-up in the condenser 136 will be caused, for example, when the reclaim reservoir 62 is substantially full, when it may contain some air, together with the withdrawn and reconditioned refrigerant in the liquid state. When the reclaim reservoir 62 is full, no more refrigerant can be pumped into it, so that continued operation of the compressor 116 will cause the noted rise in pressure. Also, if the reclaim reservoir 62 is substantially full, and the temperature rises, the refrigerant in the reclaim reservoir 62 will expand, and since the solenoid valve 66 in the outlet conduit 64 is closed, refrigerant must flow out of reclaim reservoir 62 to the condenser 136. This is permitted by the solenoid valve 144 which permits an override as indicated by the symbol adjacent to it, the higher pressure in the reclaim reservoir 62 forcing the valve off of its seat and refrigerant and/or air passing upwardly to the coil of condenser 136. Valve 44 is normally open, except when the apparatus 40 is dispensing oil or refrigerant. The condenser 136 will have part of its coil or coils filled with liquid, but also part thereof will be filled with high pressure gas. For this reason, there is space in the condenser 136 to accept overflow liquid refrigerant from the reclaim reservoir 62. Any gas, as above-explained, will rise upwardly to the top portion of the coil or coils of accumulator 136, and be adjacent the inlet, and will be discharged, as above indicated, during the dumping phase.

When the air conditioner 10 has been charged, as above indicated, the high pressure conduit 42 and the low pressure conduit 44 are disconnected from the air conditioner 10. Valves in the ends of these conduits near the connection fittings are closed, to prevent escape of refrigerant into the atmosphere. In some instances, this will occur at the end of a day's work, when temperatures might be somewhat lower. Should the ambient temperature rise, the refrigerant in the conduits 42 and 44 would expand. Rupturing of the conduits, particularly conduit 42, is avoided by the provision of the crossover solenoid operated valve 48, which is open when there is no current flowing in the solenoid thereof, and this occurs automatically when the power of the charging station 40 is turned off. Consequently, when the charging station 40 is turned off, as at the end of the day, the solenoid operated crossover valve 48 will not be energized, the valve of solenoid operated crossover valve 48 will be open, and refrigerant will be able to flow from the high pressure conduit 42 through the crossover conduit 46 and into the conduits 44, 44a, thereby avoiding an undesirably high increase of the pressure in the conduits of the charging station 40, and thus avoiding any chance of rupture of hoses from excess pressure within any of the conduits of charging station 40, and particularly of the high pressure conduit 42.

The claims and the specification describe the invention presented, and the terms that are employed in the claims draw their meaning from the use of such terms in the specification. Some terms employed in the prior art may be broader in meaning than specifically employed herein. Whenever there is a question between the broader definition of such term as used in the prior art and the more specific use of the term herein, the more specific meaning is meant.

What is claimed is:

1. Apparatus for servicing an air conditioner system comprising:

compressor means for withdrawing refrigerant from said air conditioning system and for compressing said refrigerant, means in advance of said compressor means for separating at least one of oil, liquid refrigerant, and particles from said withdrawn refrigerant, means for condensing refrigerant received from said compressor means, means for receiving said withdrawn refrigerant, means for storing make-up refrigerant,
conduits connecting in series said operator means, said compressor measns, said condenser means and said receiving means,
delivery conduit means for connecting said receiving and storing means to said air conditioner system,
means for monitoring change in quantity of refrigerant in said receiving means and said storing means,
means including electronic sequencing means and delivery conduit means for charging said air conditioning system with a predetermined quantity by dispensing substantially all of the refrigerant from said refrigerant receiving means, and as needed, make-up refrigerant from said refrigerant storing means;
said separating means comprising a cap and a body secured thereto, and means for limiting the height of liquid in said separating means.

2. The apparatus of claim 1 and further comprising means for supporting dessicant in said separating means above the maximum height of liquid in said separating means.

3. The apparatus of claim 1, further comprising inlet conduit means extending downwardly into said separator means having an outlet spaced from the top thereof.

4. Apparatus for servicing an air conditioner system comprising:
compressor means for withdrawing refrigerant from said air conditioning system and for compressing said refrigerant,
means in advance of said compressor means for separating at least one of oil, liquid refrigerant, and particles from said withdrawn refrigerant,
means for condensing refrigerant received from said compressor means,
means for receiving said withdrawn refrigerant,
means for storing make-up refrigerant,
conduits connecting in series said separator means, said compressor means, said condenser means and said receiving means,
delivery conduit means for connecting said receiving and storing means to said air conditioner system,
means for monitoring change in quantity of refrigerant in said receiving means and said storing means,
means including electronic sequencing means and delivery conduit means for charging said air conditioning system with a predetermined quantity by dispensing substantially all of the refrigerant from said refrigerant receiving means, and as needed, make-up refrigerant from said refrigerant storing means and,
a valve in said conduit connecting said condensing means and said refrigerant receiving means, said sequencing means comprising means for closing said valve while material is being dispensed to said air conditioner system;
said valve means being a solenoid valve and comprising means for permitting fluid to move from said receiving means to said condenser means, with said valve not actuated by the solenoid thereof, upon the occurrence of a predetermined pressure differential across said valve.

5. The apparatus of claim 4, wherein said condensing means comprising a motor-driven fan, said apparatus further comprising means for sensing the pressure of fluid at the inlet of said condensing means and for providing an excess pressure signal, a dump valve connected to the conduit between said compressor means and said condenser means, said last mentioned conduit having a control valve therein, a by-pass conduit connecting the high and low pressure sides of said compressor means having a by-pass valve therein, said electronic sequencing means comprising means, upon receipt of an excess pressure signal form said pressure sensing means, for emitting signals for stopping said compressor means for a predetermined time, for activating said motor-driven fan, for opening said control valve and said dump valve, and for subsequently opening said by-pass valve.

* * * * *